Patented June 10, 1941

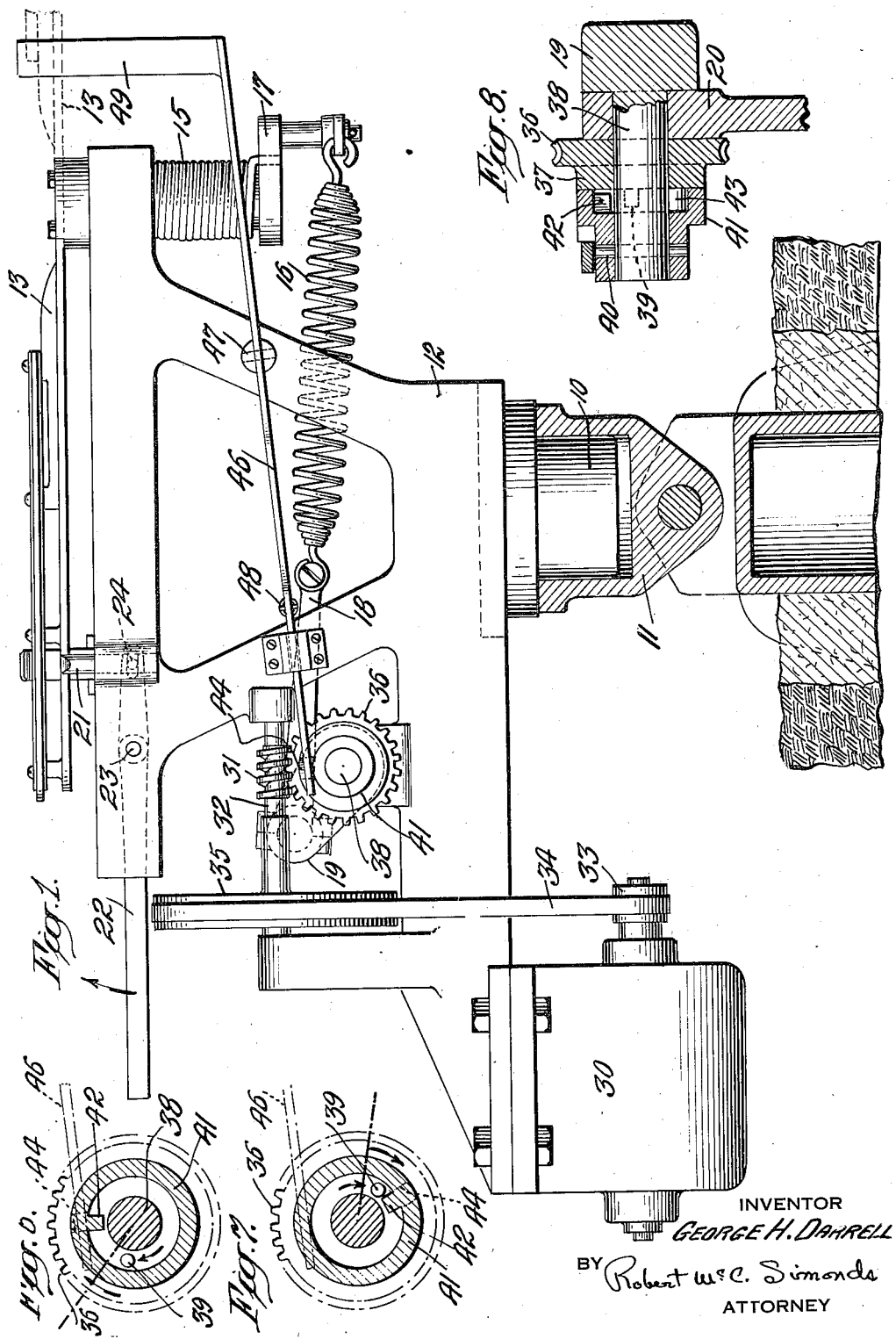

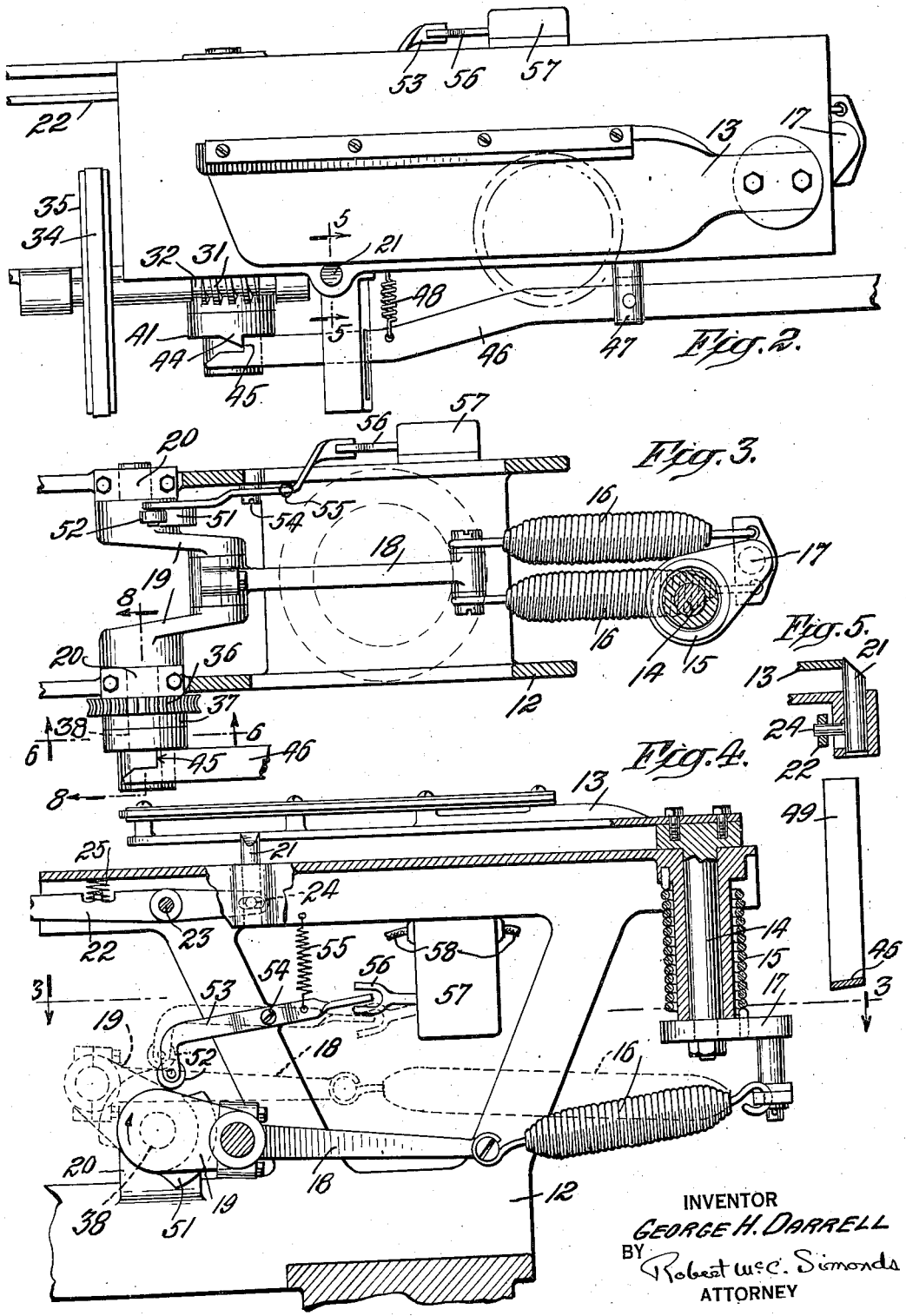

2,245,258

UNITED STATES PATENT OFFICE 2,245,258

TRAP

George H. Darrell, Stonington, Conn.

Application January 28, 1939, Serial No. 253,245

6 Claims. (Cl. 124—8)

This invention relates to an improved trap for throwing so-called clay pigeons, and more particularly to novel mechanism for automatically setting such a trap.

The customary traps heretofore in use have been set by hand. This has required much physical effort in order to overcome the force of the strong springs used to throw the pigeons, and has not infrequently changed the aim of trap. Moreover, there is a limit to the speed with which an operator can set a heavy spring trap.

According to my present invention, there is provided mechanism for mechanically and automatically setting the trap upon the discharge of each pigeon. Other features, objects and advantages of the present invention will become apparent or be pointed out in the following description of one form of mechanism illustrating the invention. Reference is made to the accompanying drawings wherein:

Fig. 1 is a side elevation of one form of trap in accordance with the invention;

Fig. 2 is a plan view looking down at the top of the trap shown in Fig. 1;

Fig. 3 is a horizontal section through the trap, taken on the line 3—3 of Fig. 4;

Fig. 4 is a vertical section through the trap, partly broken away;

Fig. 5 is a detailed section taken on the line 5—5 of Fig. 2;

Fig. 6 is a section taken on the line 6—6 of Fig. 3;

Fig. 7 is a section similar to Fig. 6, but showing the parts in a different operating position; and Fig. 8 is a section taken on the line 8—8 of Fig. 3.

The trap shown in these drawings includes a trunnion 10 carried in a suitable support 11 and mounting a frame 12 on which the various elements of the mechanism are mounted. It will be understood that the support may include any suitable means for varying the elevation and lateral angle of the trap. The trap includes an arm 13 for throwing the clay pigeon, a rock-shaft 14 to which this arm is secured, a coil spring 15 for returning the arm 13 to its position shown in Fig. 1, and heavy coil springs 16 attached at one end to a crank arm 17 on rock-shaft 14, and at the other end to a connecting rod 18 which is journalled on a crank 19 mounted in the frame through bearings 20. A locking pin 21 normally holds the pigeon throwing arm 13 in trap-set position, and is retractible by means of a hand operated lever 22 which is pivoted on the frame at 23 and connected, as shown at 24, to the locking pin 21. A spring 25, shown in Fig. 4, serves to urge the pin 21 into locking position.

An electric motor 30 is secured to the frame and drives a worm 31 on shaft 32 through a small pulley 33 on the motor shaft, a belt 34, and a large pulley 35 on the shaft 32. The worm 31 is in mesh with a gear 36 secured to a collar 37 journalled on the shaft 38 of the crank 19. As best shown in Figs. 6, 7 and 8, this collar is provided with a pin 39. Secured to the crankshaft 38, for instance by means of a pin 40, is a collar 41 which is provided with a stud 42 located in recess 43. The collar 41 is also provided with a shoulder 44 which engages a notch 45 in a latch arm 46. This arm 46 is pivoted on the frame as shown at 47 and is constantly urged toward latching position by a spring 48. Arm 46 has a vertical portion 49 at its outer end, adapted to be struck by arm 13 just after the pigeon has been discharged, when the arm 13 reaches its limit position shown in dotted lines in Fig. 1.

The crankshaft 19 is provided with a cam 51, shown in Figs. 3 and 4. This cam cooperates with a cam follower 52 mounted on a lever arm 53. This lever arm 53 is pivoted on the frame at 54 and is connected to a spring 55 which urges the cam follower against the surface of the cam. The end of the arm 53 extends between the prongs of a forked member 56 which is connected to a switch in box 57. The switch, through leads 58, serves to start and stop the motor under control of the cam 51, as will hereinafter be described.

The operation of the device is as follows: When the parts are in their position shown in Fig. 1 the trap is set. The operator then places a clay pigeon on the left hand end of the pigeon throwing arm 13. Any suitable or known device (not shown) may be employed for holding the pigeon on the arm 13 during the swinging of this arm. The operator then pushes up on the end of lever 22, thus withdrawing the locking pin 21, and permitting the arm 13 to swing forward and discharge the pigeon. As this arm approaches the end of its swing it strikes the upright portion 49 of the arm 46, thus disengaging the notched portion 45 from the flange 44, and permitting the springs 16 to contract. The crank 19 and the collar 41 are thereby rotated in a clockwise direction from their positions shown in Figs. 1 and 6 to their positions shown in Figs. 3 and 7. As the parts thus move from the positions shown in dotted lines to the positions shown in solid lines in Fig. 4, the cam follower 52 runs off the hump on the cam and starts the electric motor 30. Meanwhile, arm 13 has been returned, by the action of spring 15, to its locked position as shown in Fig. 1. The motor then turns the collar 37 to move the pin 39 from its position shown in Fig. 6 to its position shown in Fig. 7 where it engages the stud 42. The motor thus picks up speed under no load conditions before the pin 39 engages the stud 42. As the motor continues to operate, the pin 39 causes the collar 42, and through it the crankshaft 19, to rotate in a clockwise direction until the crank 19 passes dead center and the pin 39 reaches approximately the position shown in Fig. 6. At this point two operations occur: (1) the cam follower 52 runs up on the hump of the cam 51 to stop the motor; and (2) the springs 16, which have thus been placed under tension, draw the shoulder 44 into engagement with notch 45 to lock the parts in trap-set position. The trap is now ready to receive the next pigeon.

Through the present construction there is provided a trap which is mechanically and automatically returned to trap-set position, after the operator has sprung the trap to discharge a pigeon. The operator has only to place the pigeon in position, and spring the trap when the man shooting calls "pull." The present trap permits the use of springs of any desired strength for throwing the pigeons at the high speed and over a long range, all without the need for manually resetting the trap after the discharge of each pigeon. The resetting of the present trap has no tendency to change its aim. I have found that the parts can be designed so that only about two seconds are needed to reset the trap after a pigeon has been discharged. One particular advantage of the present construction is that it permits the use of an electric motor which operates always in one direction, thus avoiding the need for complicated reversing mechanism. Another advantage is that the motor starts under no load, and reaches full power before it begins to stretch the pigeon throwing springs. By stopping the motor just after the crank passes dead center and just before the parts reach trap-set position the device operates smoothly and with minimum wear. Moreover, the device is fully automatic, and can readily be incorporated in existing traps.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What I claim is:

1. A trap for throwing artificial pigeons comprising a pigeon throwing arm, a spring to operate the arm, and means to set the trap including a motor, connections between said motor and said spring, means to start the motor immediately following discharge of a pigeon, means to maintain said connections in trap-set position, and means under control of said connections for stopping the motor.

2. In a trap for throwing artificial pigeons, in combination with a throwing arm, a spring connected to said arm for throwing a pigeon, a spring for returning said arm to trap-set position, and manually operable means for holding said arm in trap-set position and releasing said arm when desired, a crank, connections between said crank and the first-named spring, a motor, a collar having a pin secured thereto and being journalled on the crankshaft, means secured to the crankshaft and adapted to be engaged by said pin during a portion of a revolution of the crankshaft and being adapted to run freely ahead of said pin during another portion of a revolution, and means actuated by the crankshaft for starting the motor and subsequently stopping the same after the crank passes dead center and just before the crank reaches trap-set position.

3. A trap for throwing artificial pigeons, comprising, a pigeon-throwing arm, means to latch the arm in trap-set position, an intermittently operating spring connected to said arm, a motor, manually controlled means for starting the motor and releasing said latching means, connections operatively interposed between said motor and said spring for restoring the spring to trap-set position, and means including a switch to automatically stop the motor each time the spring assumes trap-set position.

4. A trap according to claim 3, wherein the pigeon-throwing arm is constructed and arranged to rebound into trap-set position immediately following the discharge of a pigeon.

5. In a trap for throwing artificial pigeons, a reciprocating pigeon-throwing arm, an intermittently operating motor, a crank connected to said motor, a spring connected to said arm and to said crank, means to latch said spring in spring-set position, manually controlled means for starting the motor to restore the spring to spring-set position upon the discharge of each pigeon, and means including a switch to automatically stop the motor each time the spring is set.

6. In a trap of the character described, pigeon-throwing means comprising a reciprocating arm adapted to rebound to trap-set position upon the discharge of a pigeon, a pigeon-throwing spring operatively connected to said arm, an intermittently operating motor, means to start the motor and effect the discharge of a pigeon, means operatively connected between said motor and pigeon-throwing spring for resetting the spring upon continued operation of the motor, and means including a switch to automatically stop the motor each time the spring is set.

GEORGE H. DARRELL.